United States Patent

Varzescu et al.

(10) Patent No.: US 6,382,367 B1
(45) Date of Patent: May 7, 2002

(54) ACTUATING PISTON FOR A HYDRAULICALLY AND MECHANICALLY ACTUABLE, SPOT TYPE DISC BRAKE

(75) Inventors: Viktor Varzescu, Koblenz; Roman Zimmermann, Neuwied; Lothar Wagner, Steinefrenz; Volker Laux, Rhens, all of (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/625,372

(22) Filed: Jul. 25, 2000

Related U.S. Application Data (63) Continuation of application No. PCT/EP99/00548, filed on Jan. 28, 1999.

(51) Int. Cl.⁷ .............................. F16D 55/08; F16J 9/00
(52) U.S. Cl. ....................... 188/72.7; 188/73.1; 92/248; 60/565
(58) Field of Search ............................ 188/71.6, 264 G, 188/72.6, 72.7, 72.8, 73.1; 92/248, 212, 254; 29/888.04, 888.042, 888.044, 888.045, 888.046, 888.047; 60/565

(56) References Cited

U.S. PATENT DOCUMENTS

| | | | | |
|---|---|---|---|---|
| 3,688,875 A | * | 9/1972 | De Hoff et al. | 188/72.6 |
| 3,767,016 A | * | 10/1973 | Hurt | 188/71.9 |
| 3,851,737 A | * | 12/1974 | Hewins | 188/72.6 |
| 4,401,012 A | * | 8/1983 | Emmett | 92/248 |
| 4,449,447 A | * | 5/1984 | Yanagi | 92/248 |
| 4,572,334 A | * | 2/1986 | Villata | 188/71.6 |
| 4,595,085 A | | 6/1986 | Le Marchand et al. | |
| 5,031,511 A | * | 7/1991 | Villata | 188/71.6 |
| 5,172,792 A | | 12/1992 | Cartwright et al. | |
| 5,279,211 A | * | 1/1994 | Bentz et al. | 92/248 |
| 5,826,686 A | | 10/1998 | Rike | |
| 5,845,747 A | | 12/1998 | Rike et al. | |
| 5,988,044 A | * | 11/1999 | Meyer | 188/264 G |
| 6,085,636 A | * | 7/2000 | Ruckert et al. | 92/254 |

FOREIGN PATENT DOCUMENTS

| | | | | |
|---|---|---|---|---|
| DE | 27 22 194 | * | 11/1978 | 188/264 G |
| DE | 2739003 | | 3/1979 | |
| DE | 19534220 | | 3/1997 | |
| EP | 0062567 | | 3/1982 | |
| EP | 0403635 | | 1/1990 | |
| GB | 2 089 914 | * | 6/1982 | 188/71.6 |
| WO | WO97/18403 | | 5/1997 | |

* cited by examiner

Primary Examiner—Christopher P. Schwartz
Assistant Examiner—Thomas J. Williams
(74) Attorney, Agent, or Firm—MacMillan, Sobanski & Todd, LLC

(57) ABSTRACT

An actuating piston (10) of a hydraulically and mechanically actuable, spot-type disk brake for motor vehicles, which is disposed in a sealing and displaceable manner in a cylinder bore of the disk brake is provided with an axial-force-transmitting conical surface (18) cooperating with a corresponding conical surface of a mechanical actuating device of the disk brake. To make the actuating piston (10) lighter in weight but nevertheless to withstand greater stress, the part of the actuating piston (10) comprising the axial-force-transmitting conical surface (18) consists of steel and the part of the actuating piston (10) cooperating with the cylinder bore of the disk brake is made of light metal or of plastics material, said components of the actuating piston being constructed as a single-piece composite component.

27 Claims, 6 Drawing Sheets

ACTUATING PISTON FOR A HYDRAULICALLY AND MECHANICALLY ACTUABLE, SPOT TYPE DISC BRAKE

This application is a continuation PCT/EP99/00548, filed Jan. 28, 1999.

BACKGROUND OF THE INVENTION

The invention relates to an actuating piston for a hydraulically and mechanically actuable, spot-type disk brake. Disk brakes of said type are usually actuated for a service braking operation hydraulically, e.g. by depressing the brake pedal of a vehicle brake system, but they may also be used as a parking brake (so-called hand brake) and for said purpose are actuated mechanically, e.g. by means of a hand brake lever or a separate parking brake pedal. In disk brakes of the described type the actuating piston, often also referred to as the brake piston, may accordingly be pressed on the one hand by means of hydraulic pressure and on the other hand by a purely mechanical device against the brake lining or linings in order to achieve the brake application force required for a braking operation or for parking.

EP 0 403 635 B1 describes such a disk brake, in which during utilization as a parking brake the brake application force is transmitted to the actuating piston via an adjusting mechanism used to compensate brake lining wear. Here, a critical element as regards load is a cone clutch, which is formed by a conical flange of a strut part of the adjusting mechanism and a complementary conical surface formed on the actuating piston. Besides axial transmission of the brake application force from the adjusting mechanism to the actuating piston, the cone clutch is also intended to prevent twisting of the said two parts relative to one another. Only in the event of a compensation of lining wear by the adjusting mechanism is a slight twisting of the clutch surfaces relative to one another to be possible.

SUMMARY OF THE INVENTION

The object of the invention is to provide an actuating piston, which is suitable for use in a brake of the type described and is lighter than conventionally used actuating pistons. In particular the actuating piston to be provided, while being of a lighter weight, is to transmit high axial forces, present a low radial expansion and be capable of withstanding the stressing of the force-transmitting conical surface resulting from frictional wear.

Proceeding from the actuating piston of a spot-type disk brake such as is known from EP 0 403 635 B1, said object is achieved according to the invention in that the part of the actuating piston comprising the axial-force-transmitting conical surface is made of steel and the part of the actuating piston cooperating with the cylinder bore of the disk brake is made of light metal or of plastics material, and that the said parts of the actuating piston take the form of a single-piece composite component. The material pairing according to the invention of steel with light metal or steel with plastics material, combined with the construction of the actuating piston as a single-piece composite component, enables trouble-free transmission of the high axial forces in the order of magnitude of two tonnes despite the significantly reduced weight of the actuating piston. The axial-force-transmitting conical surface, by virtue of being made of steel, is moreover highly resistant to stress resulting from frictional wear.

In a preferred embodiment of an actuating piston according to the invention, said actuating piston is hollow and the steel component comprising the axial-force-transmitting conical surface takes the form of a hollow-cylindrical insert accommodated in the plastic or light metal part. Along with an extremely weight-saving construction this ensures good transmission of the axial-forces by the actuating piston.

When the actuating piston according to the invention is hollow, it frequently comprises a first portion with a smaller inside diameter and a second portion with a larger inside diameter. The steel component comprising the axial-force-transmitting conical surface then extends along at least approximately the entire length of the second portion, i.e. along the portion with the larger inside diameter. The effect thereby achieved is that the part of the piston skirt, which is subjected to the greatest load by the hydraulic pressure during braking and which moreover has a lower wall thickness than the remaining part of the piston skirt, is effectively strengthened by the steel component. A radial expansion of the piston skirt in said region, which may lead to jamming of the actuating piston in the cylinder, or even a cracking-open of the piston skirt is therefore counteracted. Preferably, the steel component is tubular and is manufactured by a sheet-metal forming method such as, for example, deep drawing or pressing. Pressing, here, is taken to mean that the tubular steel component is rolled against a counterbody.

According to a further developed embodiment of a hollow-cylindrical and preferably tubular steel component, which extends along the portion with the larger inside diameter of the actuating piston, said steel component at its end directed towards the first portion of the actuating piston comprises a radially directed annular flange, which preferably projects radially inwards. Such a radial annular flange stiffens the region of the steel component in which the axial-force-transmitting conical surface is disposed.

In preferred embodiments of the actuating piston according to the invention, the steel component extends not only along the second portion of the actuating piston, which has the larger inside diameter, but also extends into the first portion of the actuating piston with the smaller inside diameter. When, for example, the steel component is provided with a radially inwardly projecting annular flange which additionally stiffens the region of the steel component in which the axial-force-transmitting conical surface is disposed, then the steel component preferably continues from said radial annular flange axially into the first portion with the smaller inside diameter of the actuating piston. In said case, in a particularly preferred manner the transitional region between the radial annular flange and the continuation of the steel component into the first portion of the actuating piston is rounded off in order to facilitate damage-free introduction of sensitive components such as, for example, a seal. The steel component may extend merely into the first portion of the actuating piston but it may also extend over the entire length of the first portion of the actuating piston.

According to a still further developed embodiment of the actuating piston according to the invention, the steel component comprising the axial-force-transmitting conical surface takes the form of a substantially pot-shaped insert, which is accommodated in the plastic or light metal part and forms a part of the end face of the actuating piston directed towards a brake disk. Given a slightly increased overall weight compared to the previously described embodiment, the last-mentioned embodiment has the advantage that, even in the case of hydraulic actuation, virtually all of the axial brake application forces are transmitted via the pot-shaped insert to the brake lining, with the result that load is removed from the mechanically less stable plastic or light metal part of the actuating piston according to the invention.

The steel component, which comprises the axial-force-transmitting conical surface, of an actuating piston according to the invention, when the component of the actuating piston cooperating with the cylinder bore of the disk brake is made of light metal, is preferably cast en bloc into the light metal or is extrusion-coated with the light metal. When the component of the actuating piston cooperating with the cylinder bore of the disk brake is made of plastics material, then the steel component is preferentially extrusion-coated with the plastics material or likewise cast en bloc into the plastics material. The extrusion-coating of the steel component or the casting of the steel component en bloc into the plastic or light metal component results in an extremely intimate and hence stable connection of said two components of the actuating piston according to the invention.

Depending on which plastics material is used for the plastic component, it may be necessary to anneal the plastic component in order to achieve the required strength. As many plastics materials shrink during an annealing process so that the dimensions of the plastic component alter, it may be advantageous for the plastic component to be separately manufactured and annealed before then being connected to the steel component. In such a case, the plastic component is preferably connected by glueing or pressing to the steel component to form a single-piece composite component.

Independently of whether the plastic component is made of a material which has to be subjected to an annealing process and possibly shrinks during said process, glueing of the steel component into the plastic or light metal component has the advantage that the adhesive layer may compensate differences in expansion which may exist between the steel component and the plastic or light metal component. A further advantage is that, when the preferably tubular steel component is glued into the prefabricated plastic or light metal component, the centre line of the steel component may easily be brought into alignment with the centre line of the plastic or light metal component because the adhesive layer may be utilized to compensate the manufacturing tolerances between the steel component and the plastic or light metal component.

The adhesive may be applied over the entire surface of the steel component and/or the plastic or light metal component, but it may alternatively be provided in the form of an epoxy resin ring which is inserted between the steel component and the plastic or light metal component. Upon subsequent heating of the two components up to around 150° C., the epoxy resin melts and glues the plastic or light metal component in a hydraulically sealed manner to the steel component.

Furthermore, when the steel component is to be glued into the plastic or light metal component, the steel component together with the adjusting mechanism of the brake disposed therein may be preassembled into a constructional unit. Said constructional unit comprising adjusting mechanism and steel component is then glued into the plastic or light metal component. The temperature arising during the glueing-in process is so low that seals of the adjusting mechanism are not damaged.

The term, "composite component", used here also covers embodiments of an actuating piston according to the invention, in which there are minimal gaps between the plastic or light metal component and the steel component. In order, despite such gaps, to achieve a hydraulically sealed connection between the plastic or light metal component and the steel component, seals such as O-ring seals may be provided between said two components. Such embodiments of the actuating piston according to the invention likewise make it possible first to preassemble the steel component together with the adjusting mechanism of the brake to form a constructional unit and then to connect said constructional unit to the plastic or light metal component.

In order to increase the stability of the connection of the steel component to the plastic or light metal component even more, according to a modified embodiment of the actuating piston according to the invention the steel component at an outer circumferential surface is provided with projections, which effect positive locking between the steel component and the plastic or light metal component. Said projections may, for example, take the form of circumferential axial gearing. Other types of projections are however also suitable, e.g. an axial and circumferential knurl of the outer circumferential surface of the steel component.

In preferred refinements of the actuating piston according to the invention, the steel component at a side lying axially opposite the axial-force-transmitting conical surface comprises at least one generously dimensioned, radial annular surface. The stress on the material (in particular the compression of the material) of the light metal or plastic component which arises during the transmission of a high axial force at the transition between the steel part and the plastic or light metal part is thereby markedly reduced.

Besides the actuating piston according to the invention, the present invention also relates to a spot-type disk brake for motor vehicles, which is equipped with such an actuating piston and the weight of which is reduced by virtue of the use of the actuating piston according to the invention.

BRIEF DESCRIPTION OF THE DRAWINGS

There now follows a detailed description of two preferred embodiments of an actuating piston according to the invention with reference to the accompanying drawings. Said drawings show.

DETAILED DESCRIPTION OF THE PREFERRED EMBODIMENTS

Figure 1:
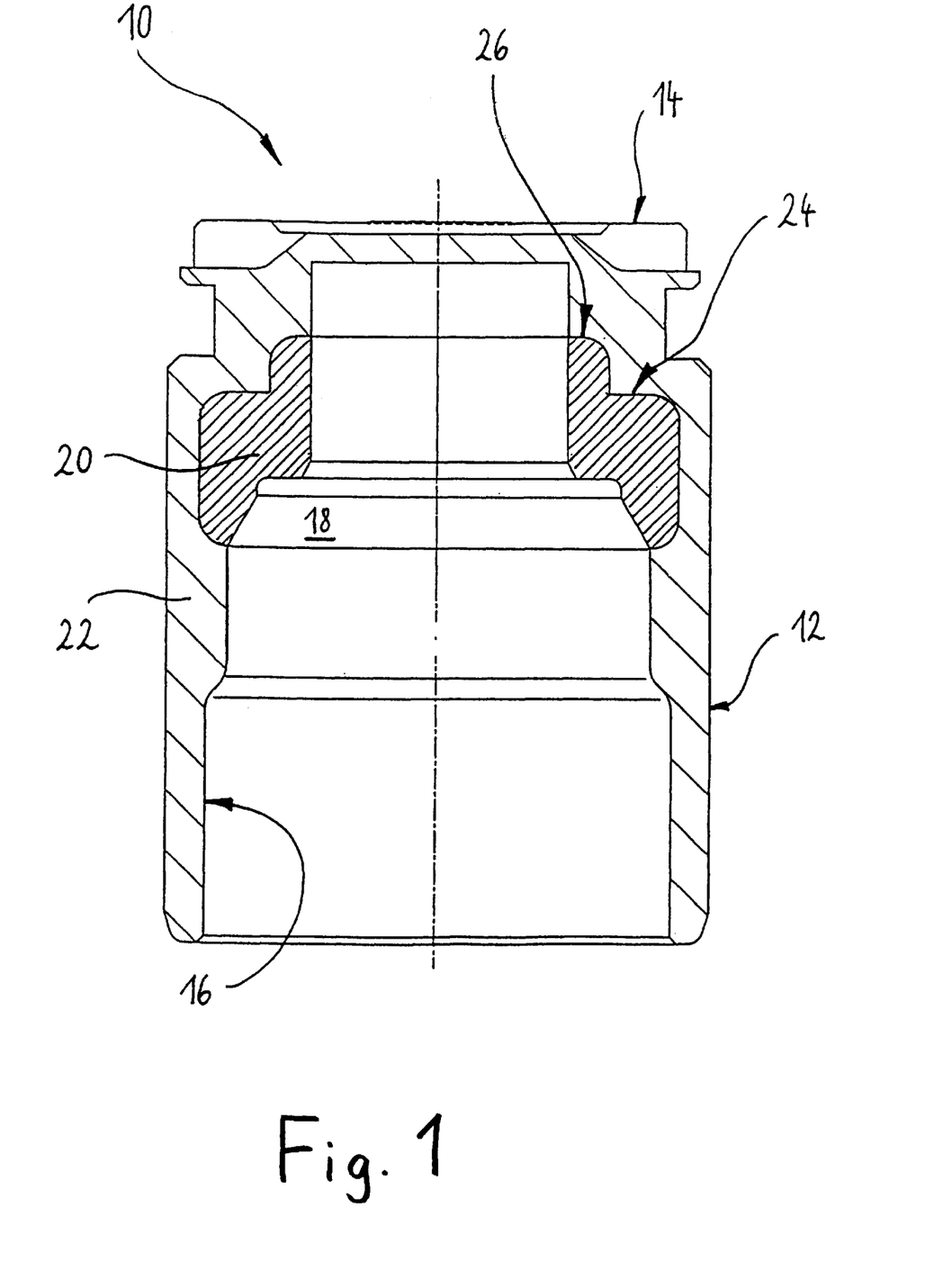
FIG. 1 a first embodiment of an actuating piston according to the invention in longitudinal section, FIG. 2 a modified, second embodiment of an actuating piston according to the invention likewise in longitudinal section, FIG. 3 a third embodiment of an actuating piston according to the invention in longitudinal section, FIG. 4 an embodiment, slightly modified compared to FIG. 3, of an actuating piston according to the invention likewise in longitudinal section, FIG. 5 an embodiment, modified once more compared to FIGS. 3 and 4, of an actuating piston according to the invention, and FIG. 6 the actuating piston shown in FIG. 5 together with essential parts of an adjusting mechanism of a disk brake.

An actuating piston 10, shown in FIG. 1, of a not further illustrated spot-type disk brake for motor vehicles has a lateral surface 12, with which the actuating piston 10 is guided in a sealing and axially sliding manner in a cylinder bore of the disk brake.

The actuating piston 10 is applied by an end face 14 against the backing plate of a brake lining of the disk brake in order to be able to press said brake lining against the brake disk. This may be effected on the one hand by means of hydraulic pressure and on the other hand by purely mechanical pressing of the actuating piston 10. Usually, in disk brakes which allow both hydraulic as well as purely mechanical pressing of the actuating piston 10, the actuating piston 10 is displaced towards the brake disk or pressed against the backing plate of the brake lining hydraulically in the case of a normal service braking operation and purely mechanically in the case of use as a parking brake. The precise operation of such disk brakes is well known to experts in the present field and is therefore not described in detail here. Reference is made to EP 0 403 635 B1, which describes in detail the operation of a disk brake, in which the actuating piston may be displaced hydraulically and purely mechanically.

An inner cavity 16 of the actuating piston 10 accommodates at least one part of an adjusting mechanism (in said regard see also FIG. 6), which is used to compensate abrasion of the friction linings of the disk brake in that the actuating piston 10, in accordance with the wear of the friction linings which has occurred, is adjusted in the direction of the brake disk so that upon use of the disk brake as a parking brake the actuator travel required for brake application remains substantially constant despite the friction linings becoming increasingly worn.

During mechanical brake application, the axial force is introduced via a conical surface 18 into the actuating piston 10. As may be seen from FIG. 1, said axial-force-transmitting conical surface 18 is formed on a hollow-cylindrical steel component 20, which is embedded in a component 22 made of plastics material or light metal, which forms the remaining part of the actuating piston 10 and in particular the part of the actuating piston which cooperates with the cylinder bore of the disk brake. The steel component 20 is cast en bloc or glued into the light metal or plastic component 22 so that the two components 20 and 22 form a single-piece composite component. When the component 22 is made of plastics material, the plastic component 22 may alternatively be injection-moulded around the steel component 20.

In order to transmit axial forces, which are introduced via the conical surface 18 into the actuating piston 10, in a manner which is gentle on the material, the steel component 20 at a side lying axially opposite the conical surface 18 has a generously dimensioned, radial annular surface 24 as well as a somewhat smaller, radial annular surface 26. Virtually all of the circumferential edges of the steel component 20 which are situated in the plastic or light metal component 22 are extremely rounded so as to avoid any stress concentration.

When the component 22 is made of light metal, the material used for the steel component 20 is preferably an X12CrNiS 18.8 steel (material number 1.4305) with a coefficient of thermal expansion of 17 to $18 \times 10^{-6}$ m/(m×K) and the material used for the light metal component 22 is an AlSi7 alloy (material number 3.2371) up to an AlSi12 alloy (material number 3.2581) with a coefficient of thermal expansion of 24 or $21 \times 10^{-6}$ m/(m×K). Given use of the said materials, in the temperature range in question the differing thermal expansion plays only a minor role on account of the coefficients of thermal expansion of both materials lying relatively close to one another. When the component 22 is made of plastics material, other steels may also be used for the steel component 20 without any difficulty.

Figure 2:
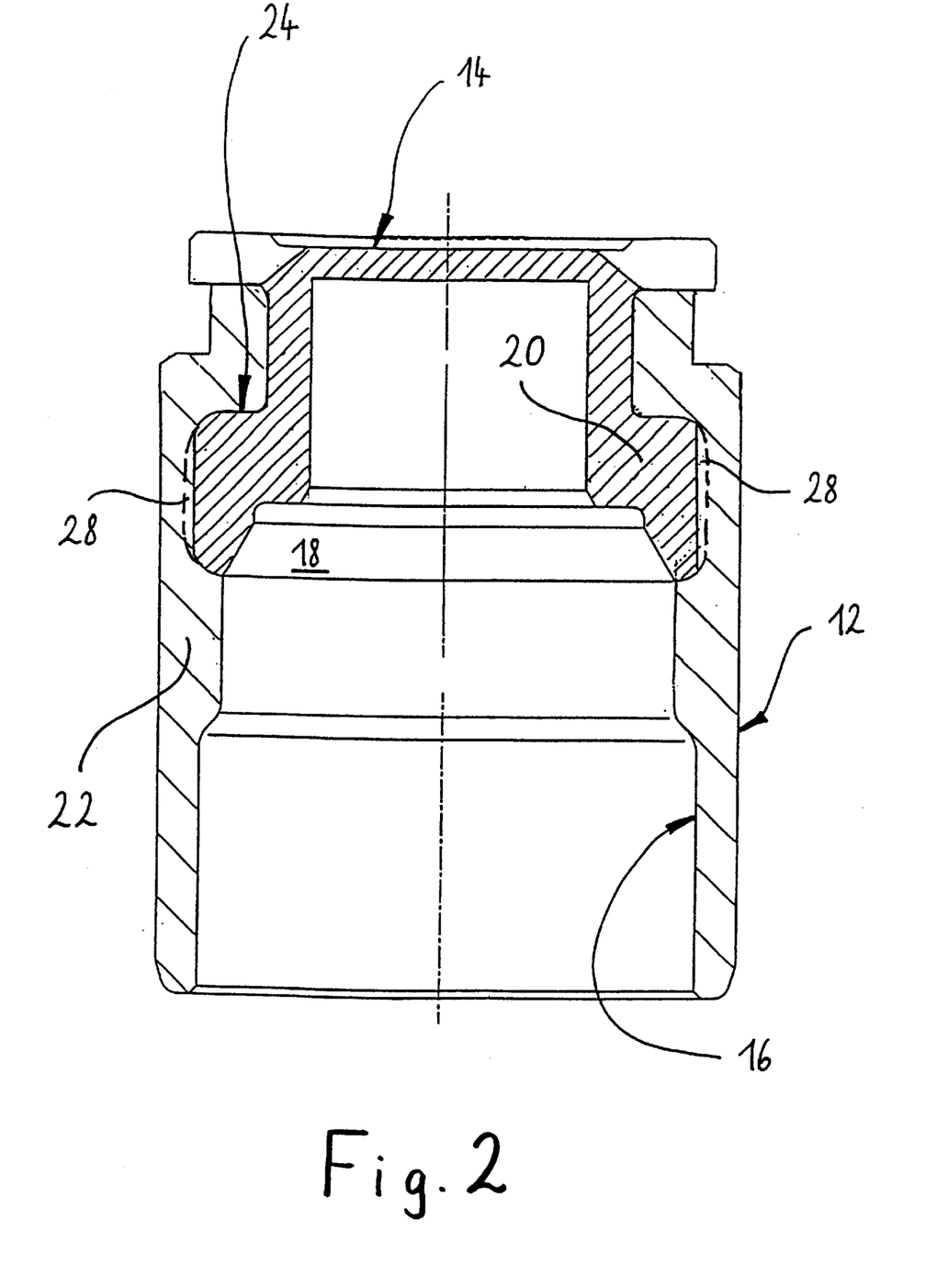

FIG. 2 shows a second embodiment of an actuating piston 10, which differs from the first embodiment in that the steel component 20 designed as an insert is not hollow-cylindrical but pot-shaped and extends as far as into the end face 14 of the actuating piston 10. The transmission of axial forces by the actuating piston 10 to a brake lining (not shown here) is effected in the second embodiment even more advantageously because an axial force introduced via the conical surface 18 may be transmitted almost exclusively directly via the steel component 20 to the brake lining. Load is therefore removed from the light metal or plastics material component 22.

For an even more stable fashioning of the intimate connection between the steel component 20 and the light metal or plastics material component 22, according to FIG. 2 a plurality of projections 28 are provided on an outer circumferential surface of the steel component 20 and result in a positive locking between the steel component 20 and the plastic or light metal component 22. The projections 28 may, for example, take the form of circumferential axial gearing extending around the outer circumferential surface of the steel component 20. It is equally possible to use a knurl, e.g. an axial and circumferential knurl, which is familiar to the person skilled in the art.

Figure 3:
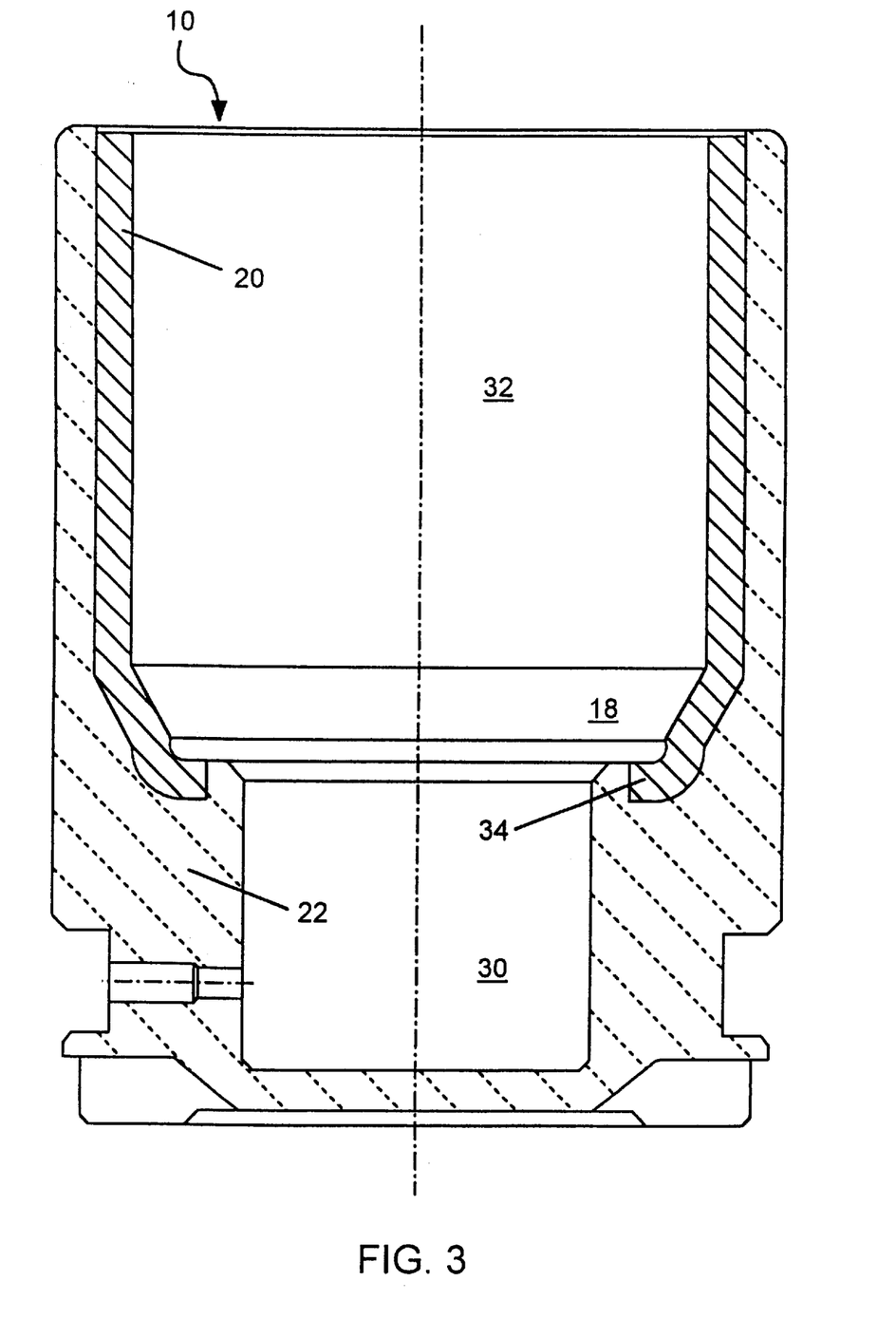

FIG. 3 shows a further embodiment of an actuating piston 10, in which the steel component 20 is tubular and constructed with a substantially equal wall thickness. The hollow actuating piston 10 has a first portion 30 and a second portion 32, wherein the inside diameter of the first portion 30 is smaller than the inside diameter of the second portion 32. The steel component 20, which carries the axial-force-transmitting conical surface 18, extends along at least approximately the entire length of the second portion 32 in the actuating piston 10 in order to strengthen the latter in said region, where the wall thickness of the plastic or light metal component 22 is relatively low, and hence counteract a radial expansion of the actuating piston 10. To stiffen the portion of the steel component 20 in which the axial-force-transmitting conical surface 18 is situated, the steel component 20 is provided with a radially inwardly projecting annular flange 34, which in the embodiment illustrated in FIG. 3 is situated at the end of the steel component 20 directed towards the first portion 30 of the actuating piston 10.

Figure 4:
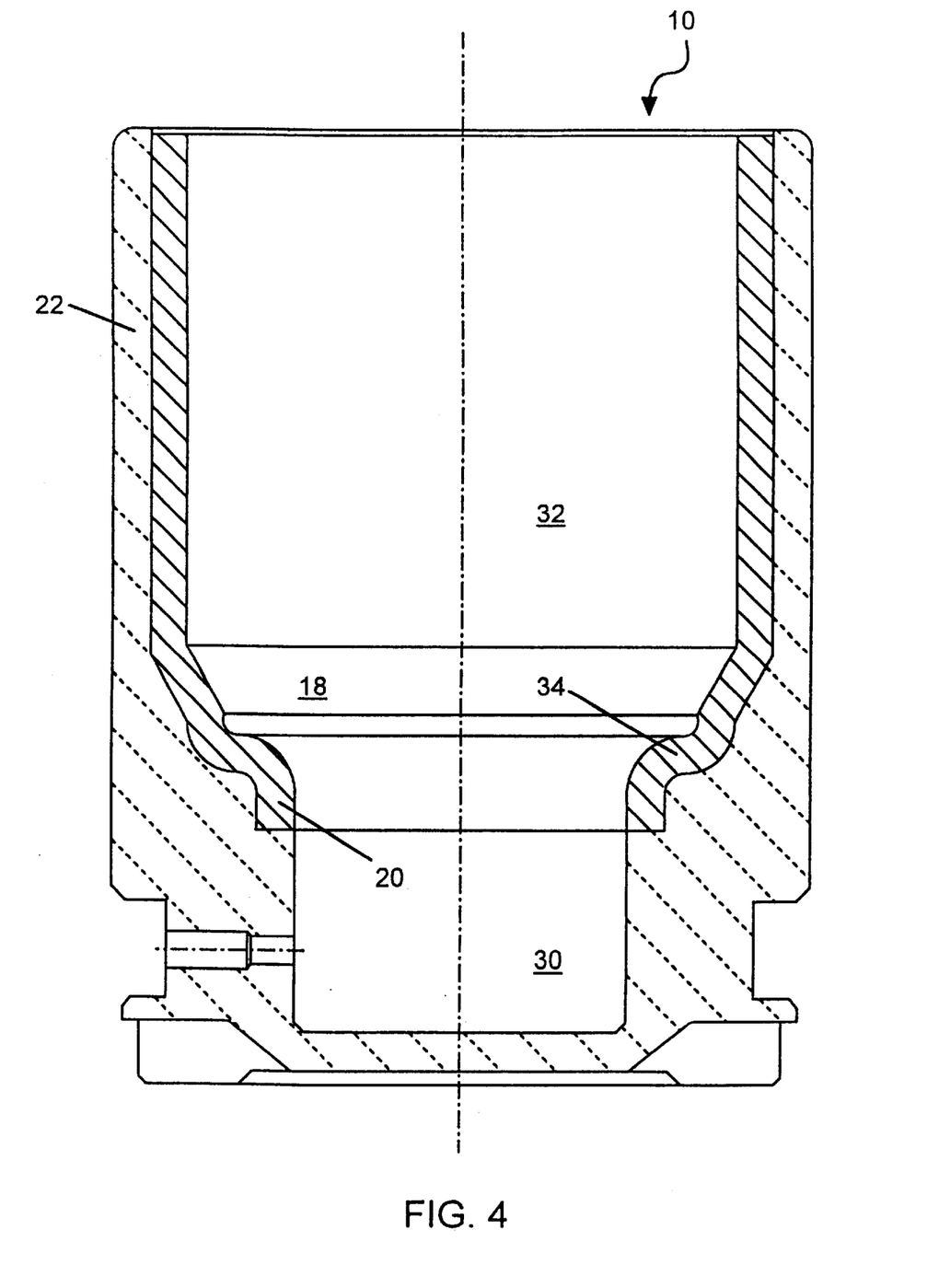

According to FIG. 4, which shows an embodiment of an actuating piston 10 similar to FIG. 3, the steel component 20 extends not only along the second portion 32 of the actuating piston 10 but also into its first portion 30. The transitional region between the annular flange 34 and the smaller-diameter part of the steel component 20 is in said case rounded off in order to facilitate the introduction of a seal of the adjusting mechanism (in said regard see FIG. 6) into the first portion 30 and prevent damage to the seal.

Figure 5:
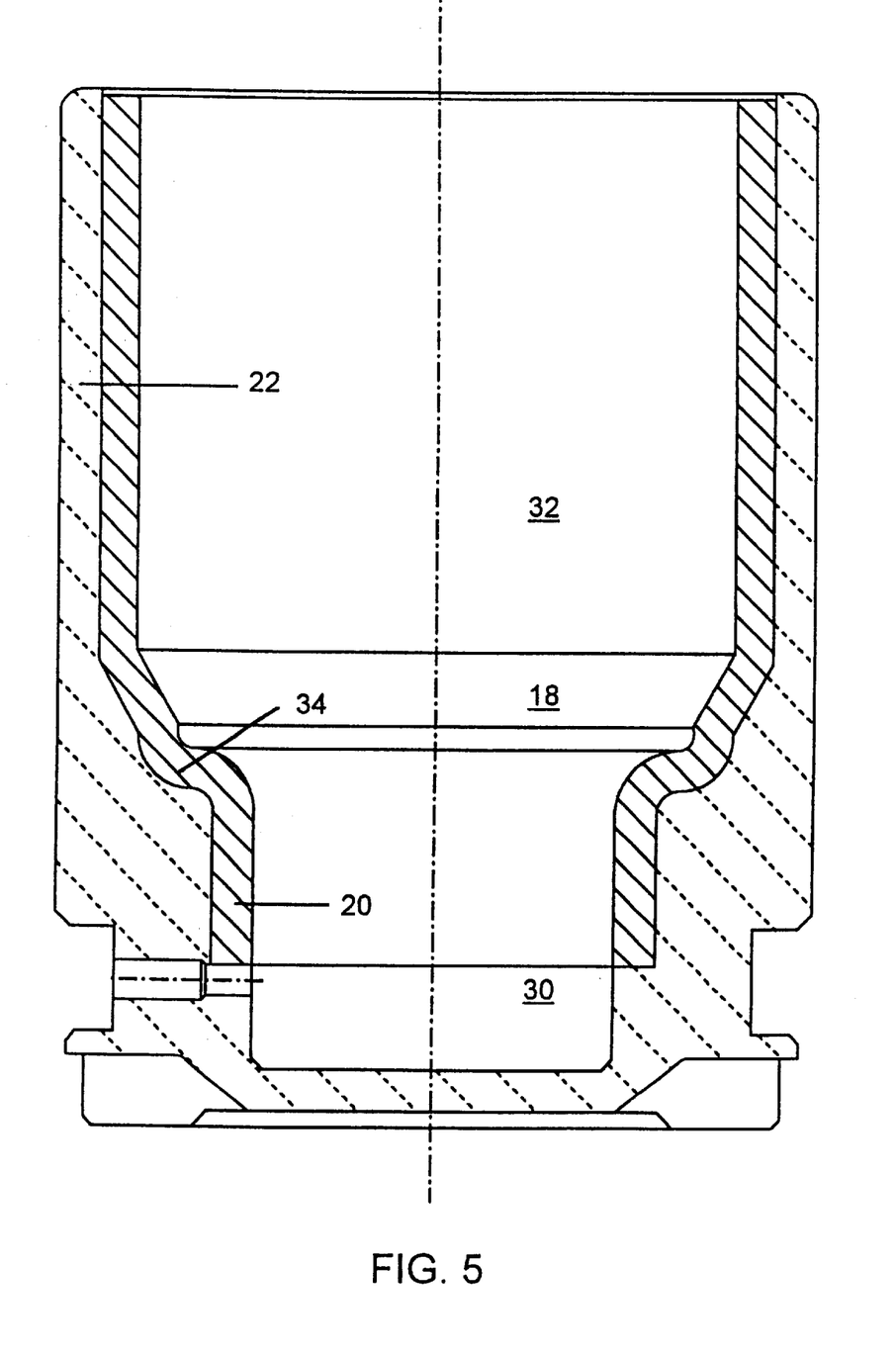

According to FIG. 5, which shows a once more modified embodiment of an actuating piston 10 similar to FIGS. 3 and 4, the tubular steel component 20 extends even further into the first portion 30 of the actuating piston 10. It is thereby ensured that the seal 36 of the adjusting mechanism, which may be seen in FIG. 6, during its entire axial displacement travel is always in contact with the inner surface of the steel component 20, which inner surface for said purpose is finish-machined in said region, i.e. along the first portion 30.

Figure 6:
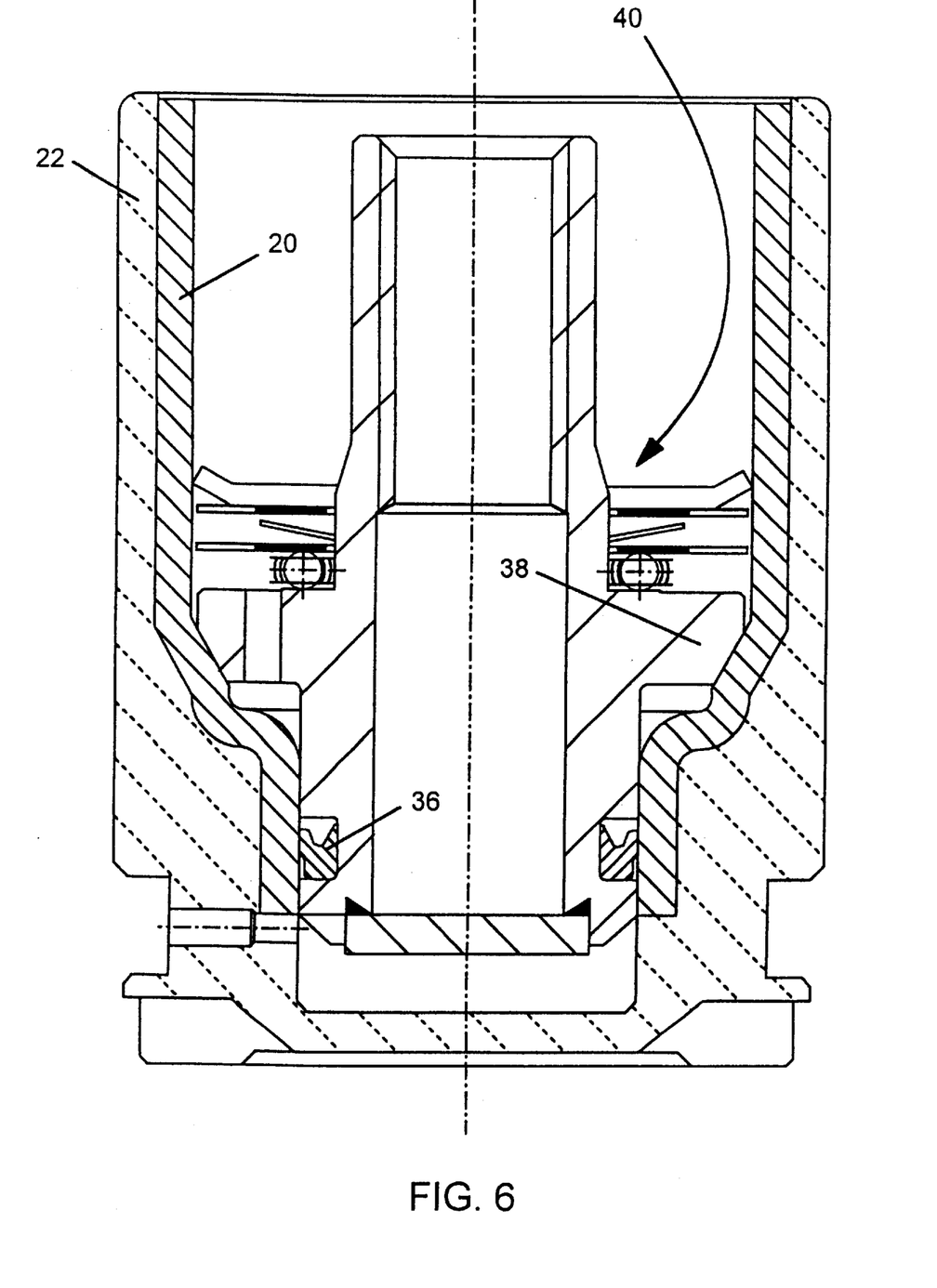

For a better understanding, FIG. 6 shows the actuating piston 10 of FIG. 5 together with essential parts of an adjusting mechanism 40, such as is known, for example, from EP 0 403 635 B1 and which is not described in detail here. It is clearly evident from FIG. 6 how the axial-force-transmitting conical surface 18 on the steel component 20 cooperates with a corresponding conical surface formed on an adjusting nut 38 of the adjusting mechanism 40.

What is claimed is:

1. An actuating piston of a hydraulically and mechanically actuable disk brake for motor vehicles for arrangement in a sealing and displaceable manner in a cylinder bore of the disk brake, which actuating piston comprises an axial force transmitting conical surface, characterized in that a component part of said actuating piston comprising said axial force transmitting conical surface is made of steel and a component part of said actuating piston for cooperating with the cylinder bore of the disk brake is made of light metal or of plastics material, that said component parts of said actuating piston together form a single piece composite component, and that said actuating piston is hollow and said steel component comprising said axial force transmitting conical surface is designed as a substantially pot shaped insert received in said plastic or light metal component, said pot shaped insert forms a part of an end face of said actuating piston directed towards a brake disk.

2. The actuating piston according to claim 1, characterized in that said steel component is cast en bloc into said plastics material.

3. The actuating piston according to claim 1, characterized in that said steel component is extrusion coated with said plastics material.

4. The actuating piston according to claim 1, characterized in that said steel component is glued to said plastic component.

5. The actuating piston according to claim 1, characterized in that said steel component is pressed into said plastic component.

6. The actuating piston according to claim 1, characterized in that at an outer surface said steel component is provided with projections which effect a positive lock with said elastic component.

7. An actuating piston of a hydraulically and mechanically actuable disk brake for motor vehicles for arrangement in a sealing and displaceable manner in a cylinder bore of the disk brake, which actuating piston comprises an axial force transmitting conical surface, characterized in that a component part of said actuating piston comprising said axial force transmitting conical surface is made of steel and a component part of said actuating piston for cooperating with the cylinder bore of the disk brake is made of light metal or of plastics material, that said component parts of said actuating piston together form a single piece composite component, that said actuating piston is hollow and said steel component comprising said axial force transmitting conical surface takes the form of a hollow cylindrical insert accommodated in said plastic or light metal component, and that said hollow actuating piston comprises a first portion with a first inside diameter and a second portion with a second inside diameter which is greater than said first inside diameter, and that said steel component comprising said axial force transmitting conical surface extends along at least approximately an entire length of said second portion.

8. The actuating piston according to claim 7, characterized in that said steel component comprising said axial force transmitting conical surface extends into said first portion of said actuating piston.

9. The actuating piston according to claim 7, characterized in that said steel component comprising said axial force transmitting conical surface is provided at its end directed towards said first portion of said actuating piston with an annular flange which projects radially inward.

10. The actuating piston according to claim 9, characterized in that said steel component comprising said axial force transmitting conical surface extends into said first portion of said actuating piston.

11. The actuating piston according to claim 7, characterized in that said steel component is cast en bloc into said plastics material.

12. The actuating piston according to claim 7, characterized in that said steel component is extrusion coated with said plastics material.

13. The actuating piston according to claim 7, characterized in that said steel component is glued to said plastic component.

14. The actuating piston according to claim 7, characterized in that said steel component is pressed into said plastic component.

15. The actuating piston according to claim 7, characterized in that at an outer surface said steel component is provided with projections which effect a positive lock with said plastic component.

16. An actuating piston of a hydraulically and mechanically actuable disk brake for motor vehicles for arrangement in a sealing and displaceable manner in a cylinder bore of the disk brake, which actuating piston comprises an axial force transmitting conical surface, characterized in that a component part of said actuating piston comprising said axial force transmitting conical surface is made of steel and a component part of said actuating piston for cooperating with the cylinder bore of the disk brake is made of light metal or of plastics material, that said component parts of said actuating piston together form a single piece composite component, that said steel component has at least one generously dimensioned radial annular surface on a side lying axially opposite the axial force transmitting conical surface which contacts an adjacent surface of said light metal or plastic component, and that said actuating piston is hollow and said steel component comprising said axial force transmitting conical surface is designed as a substantially pot shaped insert received in said light metal or plastic component, said pot shaped insert forms a part of an end face of said actuating piston directed towards a brake disk.

17. The actuating piston according to claim 16, characterized in that said hollow actuating piston comprises a first portion with a first inside diameter and a second portion with a second inside diameter which is greater than said first inside diameter, and that said steel component comprising said axial force transmitting conical surface extends along at least approximately an entire length of said second portion.

18. The actuating piston according to claim 17, characterized in that said steel component comprising said axial force transmitting conical surface extends into said first portion of said actuating piston.

19. The actuating piston according to claim 17, characterized in that said steel component comprising said axial force transmitting conical surface is provided at its end directed towards said first portion of said actuating piston with an annular flange which projects radially inward.

20. The actuating piston according to claim 17, characterized in that said steel component comprising said axial force transmitting conical surface extends into said first portion of said actuating piston.

21. The actuating piston according to claim 16, characterized in that said steel component is cast en bloc into said light metal or plastics material.

22. The actuating piston according to claim 16, characterized in that said steel component is extrusion coated with said light metal material.

23. The actuating piston according to claim 16, characterized in that said steel component is glued to said light metal or plastic component.

24. The actuating piston according to claim 16, characterized in that said steel component is pressed into said plastic or light metal or plastic component.

25. The actuating piston according to claim 16, characterized in that at an outer surface said steel component is provided with projections which effect a positive lock with said light metal or plastic component.

26. An actuating piston of a hydraulically and mechanically actuable disk brake for motor vehicles for arrangement in a sealing and displaceable manner in a cylinder bore of the disk brake, which actuating piston comprises an axial force transmitting conical surface, characterized in that a component part of said actuating piston comprising said axial force transmitting conical surface is made of steel and a component part of said actuating piston for cooperating with the cylinder bore of the disk brake is made of light metal or of plastics material, that said component parts of said actuating piston together form a single piece composite component, and that said plastic or light metal component is a light metal component and consists of an AlSi7 alloy up to an AlSi12 alloy with a co efficient of thermal expansion of 24 or 21×10$^{-6}$ m/(m×K) and that the steel component consists of X12CrNiS 18.8 steel with a coefficient of thermal expansion of 17 to 18×10$^{-6}$ m/(m×K).

27. A method for producing an actuating piston adapted for use in a hydraulically and mechanically actuable disk brake, which is disposed in a sealing and displaceable manner in a cylinder bore of the disk brake and which includes an axial force transmitting conical surface, which cooperates with a corresponding conical surface of a mechanical actuating device of the disk brake, the method comprising the steps of:

(a) providing at steel component part of the actuating piston which defines the axial force transmitting conical surface;

(b) providing a light metal or plastic component part of the actuating piston which cooperates with the cylinder bore of the disk brake;

(c) arranging an epoxy resin ring between the steel component and the plastic or light metal component;

(d) heating the steel component and the plastic or light metal component with the interposed epoxy resin ring until the epoxy resin melts; and (e) allowing the epoxy resin to solidify.

* * * * *

UNITED STATES PATENT AND TRADEMARK OFFICE
CERTIFICATE OF CORRECTION

PATENT NO. : 6,382,367 B1
DATED : May 7, 2002
INVENTOR(S) : Viktor Varzescu et al.

It is certified that error appears in the above-identified patent and that said Letters Patent is hereby corrected as shown below:

<u>Column 7,</u>
Line 4, delete "elastic" and insert -- plastic --.

Column 9,
Line 14, delete "co efficient" and insert -- coefficient --.

<u>Column 10,</u>
Line 8, delete "at" and insert -- a --.

Signed and Sealed this

Sixteenth Day of July, 2002

Attest:

JAMES E. ROGAN
*Attesting Officer*  *Director of the United States Patent and Trademark Office*